Patented Oct. 22, 1929

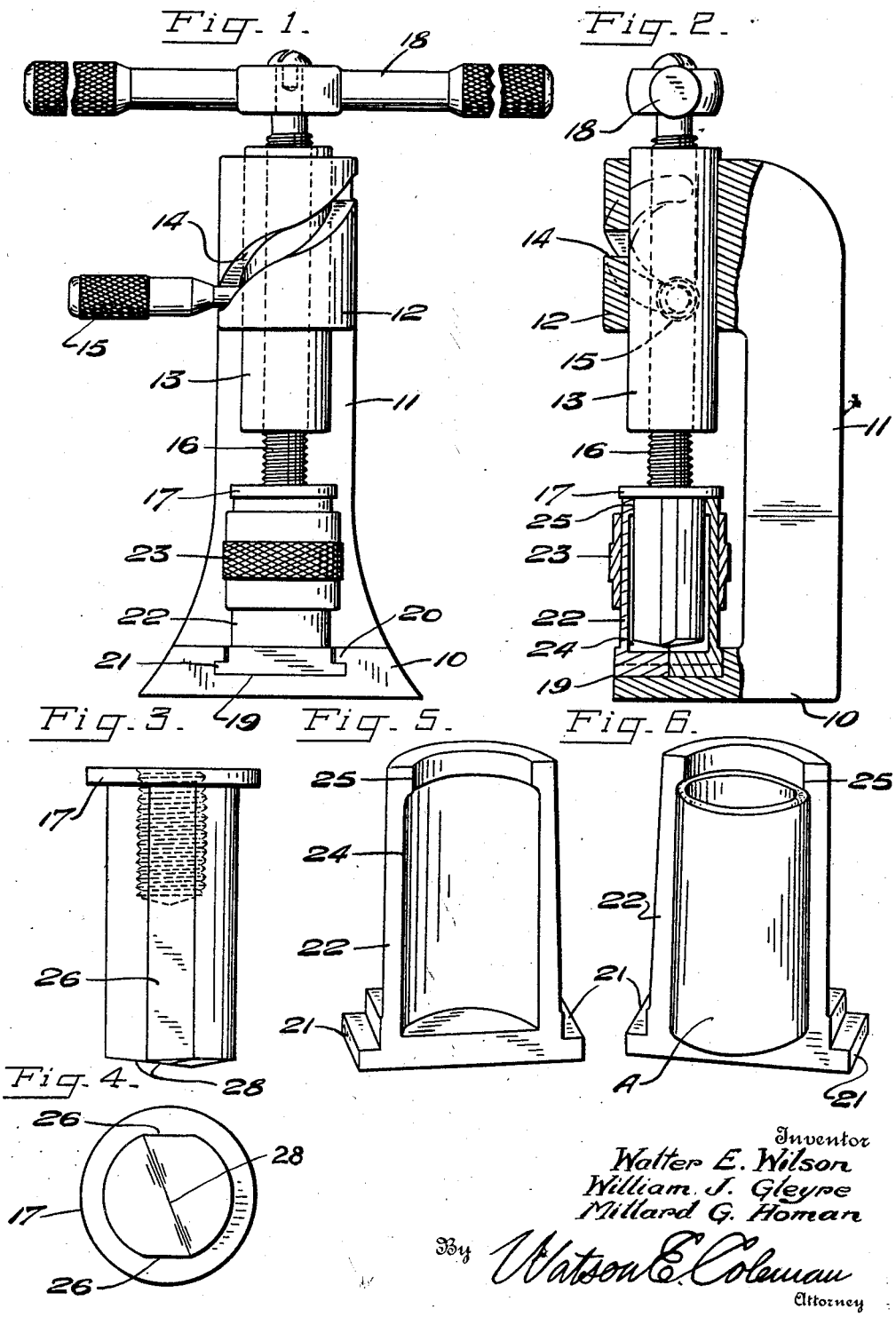

1,732,322

UNITED STATES PATENT OFFICE

WALTER E. WILSON, WILLIAM J. GLEYRE, AND MILLARD G. HOMAN, OF GRAND JUNCTION, COLORADO, ASSIGNORS TO KICK PRODUCTS CORPORATION, OF GRAND JUNCTION, COLORADO, A CORPORATION OF COLORADO

MACHINE FOR MAKING EDIBLE CUPS

Application filed May 12, 1927. Serial No. 190,836.

This invention relates to machines for making cups of cold or solid chocolate or other edible material, the cups being designed to receive ice cream or other confection of like character as is illustrated and described in the pending application for patent, Serial #178,759, filed on the 26th day of March, 1927, by the said W. E. Wilson.

It has heretofore been considered impossible to mold a chocolate cup with chocolate in a cold or solid state, as confectioners have believed that the chocolate would crumble instead of molding under pressure unless the chocolate was in a heated or molten state.

The general object of this invention, therefore, is to provide means for molding solids by a revolving, sweeping motion in combination with longitudinal pressure, to thus provide means whereby any solid candy-like material may be molded into a cup-like or other form unless the material is dry grained.

Another object of the present invention is to provide a machine whereby pellets of chocolate or other cold and solid pellets, after being dropped into a steel cup or mold, may be ground up and forced into the form of a cup, this cup being designed to receive ice cream or like confection and to be wrapped in paper so that the ice cream may be sold in these chocolate-covered packages and the edible cup and ice cream eaten together after the removal of the paper.

A further object of the invention is to provide a machine whereby these cups may be formed which includes a mold, a plunger movable into the mold, means for rotating the plunger as it moves into the mold so that the sides of the chocolate or other candy cup are smoothed and excess chocolate extruded, and means whereby the plunger may be raised quickly, while at the same time giving it a rotative action so that the sides of the candy cup are still further smoothed and made perfect.

A still further object is to so form the plunger that it will extrude excess chocolate, that it shall give a smooth interior finish to the interior of the cup and will level and smooth the bottom of the cup, and shall permit air to pass out from between the plunger and the mold to thereby permit the plunger to be withdrawn.

One form of this mechanism is illustrated in the accompanying drawing, wherein:—

Figure 1 is a front elevation of a cup-making machine constructed in accordance with our invention;

Figure 2 is a vertical sectional view thereof from front to rear;

Figure 3 is an elevation of the plunger;

Figure 4 is an inverted plan view thereof;

Figure 5 is an elevation of one of the sections of the mold;

Figure 6 is an elevation of the other section of the mold showing the candy cup therein.

Referring to this drawing, 10 designates a base having an upwardly extending standard 11, this standard at its upper end being cylindrical in form, as at 12. Normally disposed within the cylindrical portion of the standard is an interiorly screw-threaded bearing sleeve 13, and the cylindrical portion 12 of the standard is formed with a helical slot 14. The bearing member 13 is provided with an outwardly projecting handle 15 extending through this slot. This slot at opposite ends extends for a short distance at right angles to the axis of the slot.

Operating through the bearing member 13 is a screw-threaded plunger rod 16 which carries at its lower end the plunger head 17, which will be described in detail later. The screw-threaded rod 16 at its upper end extends through the upper end of the standard and carries upon it the handle 18 whereby the plunger rod may be rotated. This handle 18 may be of any suitable form.

The base 10 is formed with a recess or slideway 19 having overhanging or undercut walls 20 and adapted to be disposed in this slideway is the base 21 of a sectional mold 22. This mold is formed in two vertically extending sections dividing the mold in halves and the mold is held closed by means of a collar 23 or other suitable means for this purpose. The mold is somewhat tapering so that as the collar is forced down it will jam the two sections together. The interior of the mold is increased in diameter, as at 24, from a point somewhat below the upper end of the mold to the bottom of the mold, this increase in diameter being sufficient to accommodate the chocolate cup, designated A, which is formed within the mold. The plunger has an exterior diameter approximately the same as the interior diameter of the upper end of the mold above the shoulder 25.

In the use of this mechanism, pellets of chocolate or other suitable material which are provided by the dealer for this purpose and are in a cold and solid condition are dropped into the bottom of the mold. The number of pellets is just sufficient to cause the proper filling of the mold. The plunger is then rotated by means of the handle 18 and the plunger rod is screwed downward. The plunger rotates as its moves downward and crushes the cold pellets and forces the crushed material outward and upward along the sides of the steel cup in the space provided between the revolving plunger and the sides of the cup, and this forms the cup, as illustrated in Figure 6. The plunger may then be reversed to raise the plunger and at the same time rotate it so that the sides of the candy cup are smoothed, but preferably the construction is as illustrated wherein the plunger is raised by rotating the handle 15 from its lowered position to its upper position which, of course, causes the lifting of the bearing 13 and the bodily lifting of the plunger while giving it a half rotation.

It will be seen that this bearing 13 raises and lowers by what may be termed a bolt action and that the bearing is locked in place at either end of the track or slot by means of the "bolt" or handle 15 being in the straight portion of the slot. The preliminary action of the plunger to lower it is caused by shifting this handle or bolt 15 from its raised to its lowered position, thus doing away with a considerable amount of rotation necessary if the plunger was lowered by rotating the handle 18 entirely.

As previously stated, the cup is formed by forcing the plunger downward and simultaneously rotating it in contact with a pellet or pellets contained within the mold in such a manner as to force the material in a cold solid form outward and upward along the sides of the mold and plunger. Previous to placing the pellet in the mold, a paper bottom is inserted therein and a wrapper is placed within the mold and the pellet is placed within the exact center of this wrapper and upon this paper bottom. When the two halves of the mold are placed together, the halves are encircled by a steel ring 23 which locks the halves securely together, thus resisting the high pressure of the plunger as it engages the pellet and forces the chocolate up the side walls to form the cup with a wrapper in place on the outside thereof. This wrapper and the bottom of the chocolate cup are easily removed when the cup is being eaten.

Attention is called to the peculiar formation of the plunger. It will be seen that the plunger is tapered or "drafted" $\frac{1}{32}''$ from top to bottom and that the plunger has two flat sides or faces 26 extending from the lower end of the plunger upward to the stop flange 17 at the top of the plunger. The lower end of the plunger is so formed as to provide a transverse ridge 28 extending from the corner of one flat side to the corner of the other flat side diametrically across the bottom of the plunger and from this ridge the bottom of the plunger inclines upward toward the sides of the plunger. The bevel on the bottom of the lower end of the plunger not only assists in crushing the solid material, but as the plunger turns it pushes this crushed material out toward the walls of the molding cup. This crushed material is then pushed up under the pressure exerted by the descending plunger, the material passing upward along the flat surfaces 26 on the sides of the plunger. As the plunger revolves, the material is thus deposited and smoothed or "ironed" into the form of a cup. The flat sides 26 constitute feeders or channels for the conveyance of the crushed material from the bottom to the top of the wall being built up, and in the revolving of the plunger this material is deposited evenly on the top of the wall and is ironed in place as soon as deposited in the downward revolutions of the plunger. When the plunger has reached the limit of its downward movement, all of the material has been crushed, pushed outward and upward, and is practically all in place. The rotation of the plunger is then reversed and begins its upward revolutions, in which the plunger further smoothes and irons the inner walls of the cup so that when the process is completed the interior surface of the cup is smooth and compact, much resembling the results secured if chocolate or substances of that nature in a liquid or semi-liquid state are poured in a mold.

It will thus be seen that the bevels on each side of the diametrical ridge 28 have two main purposes, one to crush the material more easily than would a flat surface, and second to more readily push out this crushed material from the center to the outer edge where it is naturally carried up in the channel provided by the slightly flattened sides. These slightly flattened sides also form channels down which air may pass to permit the upward movement of the plunger. Thus the plunger acts to sweep and smooth the interior face of the cup and cause the excess chocolate or other candy to pass out at the top and be cut off by the stop flange.

By means of this mechanism we are enabled to mold a chocolate or candy cup in a cold or solid state which has heretofore been thought to be impossible. Thus it is possible to furnish dealers with these cup-forming devices and with chocolate pellets so that any dealer may make his own cup out of fresh chocolate ready to be filled with ice cream by means of the ice cream gun shown in our beforementioned application.

While we have heretofore referred to chocolate or candy, it will be understood that we do not wish to be limited to the use of this mechanism for the formation of candy cups alone or chocolate cups alone, as other edible material may be used from which the cups may be formed by this apparatus. Thus we have used our machine for the production of edible cups from graham crackers, fondants, cornstarch mixed with various confections including chocolate, all kinds of chocolate coatings, nuts alone and mixed with other ingredients, or from malted milk or honey mixed with other ingredients, and from other compounds. It is to be noted that with each of the ingredients used no preparatory measures are necessary in order to prepare them for the machine other than to measure or approximate the amount to be used. Neither is the material specially treated, ground, or the particles separated, but no matter what the nature of the material may be, this machine grinds up the hard and dry material, forms it into shape and smooths it into a firm, dry, hard cup which under tests maintained its shape until used, without the necessity of refrigeration. Neither do we wish to be limited to the exact form of the mechanism illustrated in the drawings, as this may be varied without departure from the spirit of the invention. Thus the mold may be rotated and advanced toward a fixed plunger or the plunger may be rotated and advanced toward a fixed mold, or both may be rotated with relation to each other.

It is also to be understood that the slot 14 may be so elongated vertically as to permit force being exerted directly downward so that the plunger may engage the top of the pellet and thus force exerted to such an extent as to materially crush the pellet before the handle or lever 18 is put in operation and the circular action caused to take place. While we have illustrated the plunger as being formed with two oppositely disposed flat faces 26, we do not wish to be limited to this as more of these flat faces might be provided. These flattened faces assist in spreading material around the inner face of the mold and also provide a space permitting the air to pass inward when the plunger is being withdrawn from the completely molded cup so that there will be no danger of suction. Otherwise the sides of the cup would adhere so closely to the sides of the plunger that difficulty would be experienced in readily withdrawing the plunger from the cup. In the drawings, the angularly related faces of the lower end of the plunger have been slightly exaggerated. These flattened surfaces offer continuous angles by which the plunger may clean itself by friction with the bottom of the cup and further assist in forcing the chocolate outward from the center.

We claim:—

1. Means for molding chocolate or other edible material comprising a sectional mold, a base upon which the mold is supported having a standard, the standard supporting a screw-threaded bearing, a screw-threaded plunger rod passing through the bearing and having means whereby it may be rotated, a plunger carried upon the lower end of the rod and rotating therewith and engaging in the mold, and means for raising or lowering the bearing which supports the plunger rod.

2. Means for molding chocolate or other edible material comprising a sectional mold, a base upon which the mold is supported having a standard, the standard supporting a screw-threaded bearing, a screw-threaded plunger rod passing through the bearing and having means whereby it may be rotated, a plunger carried upon the lower end of the rod and rotating therewith and engaging in the mold, the bearing being vertically and rotatively movable with relation to the standard and the standard having a helical slot, and a handle extending through said slot into the movable bearing whereby as the handle is shifted in one direction or the other the bearing may be raised or lowered.

3. A molding machine of the character described including a base having an upwardly extending standard, the upper end of the standard being cylindrical, a screw-threaded bearing mounted within the standard for vertical and rotative movement, the cylindrical portion of the standard being formed with a helical slot, a handle extending inward through said slot and engaged with the bearing to oscillate it, a sectional mold detachably mounted upon the base, a plunger rod having screw-threaded engagement with said bearing and having means whereby it may be rotated, and a plunger mounted upon the lower end of the plunger rod and rotating therewith and coacting with the mold.

4. A machine for molding candy or other edible articles in a cold state including a mold and a coacting plunger, means whereby the mold and plunger may be moved longitudinally relative to each other and simultaneously rotated relative to each other, the mold being cylindrical and the plunger approximately fitting the mold but being less in diameter than the mold, the outer end of the plunger being beveled to provide a radial, diametrically extending ridge and two faces on each side of the ridge inclined outward and upward.

5. A machine for molding candy or other edible articles in a cold state including a mold and a coacting plunger, means whereby the mold and plunger may be moved longitudinally relative to each other and simultaneously rotated relative to each other, the mold being cylindrical and the plunger approximately fitting the mold but being less in diameter than the mold, the outer end of the plunger being beveled to provide a radial, diametrically extending ridge and two faces on each side of the ridge inclined outward and upward, the sides of the plunger being formed with two flat, longitudinally extending faces, the ridge intersecting a boundary of each longitudinally extending face.

6. The method of forming edible cups consisting of disposing within a mold having the shape of the cup to be formed, hard, cold, edible material, disposing a plunger in the mold and forcing the plunger inward while rotating it to thereby grind up the edible material and force it laterally upward around the plunger and between the plunger and the inside face of the mold, and then withdrawing the plunger while rotating it to thus smooth the inner face of the cup thus formed.

In testimony whereof we hereunto affix our signatures.

WALTER E. WILSON.
WILLIAM J. GLEYRE.
MILLARD G. HOMAN.